US009252701B1

(12) United States Patent
Tarabishi

(10) Patent No.: US 9,252,701 B1
(45) Date of Patent: Feb. 2, 2016

(54) ULTIMATE RENEWABLE SOLAR ENERGY AND STORAGE SYSTEM

(71) Applicant: Hisham Tarabishi, Pittsburgh, PA (US)

(72) Inventor: Hisham Tarabishi, Pittsburgh, PA (US)

( * ) Notice: Subject to any disclaimer, the term of this patent is extended or adjusted under 35 U.S.C. 154(b) by 0 days.

(21) Appl. No.: 14/497,631

(22) Filed: Sep. 26, 2014

Related U.S. Application Data

(60) Provisional application No. 61/998,754, filed on Jul. 8, 2014.

(51) Int. Cl.
| | | |
|---|---|---|
| *H01L 31/024* | (2014.01) | |
| *H02S 10/30* | (2014.01) | |
| *F03G 6/04* | (2006.01) | |

(52) U.S. Cl.
CPC .. *H02S 10/30* (2014.12); *F03G 6/04* (2013.01)

(58) Field of Classification Search
CPC .............. H01L 31/101; H01L 31/1013; H01L 31/0547
USPC ......................................................... 136/248
See application file for complete search history.

(56) References Cited

U.S. PATENT DOCUMENTS

| | | | |
|---|---|---|---|
| 3,988,166 A | | 10/1976 | Beam |
| 4,038,971 A | | 8/1977 | Bezborodko |
| 4,286,581 A | | 9/1981 | Atkinson, Jr. |
| 5,275,149 A | | 1/1994 | Ludlow |
| 5,312,521 A | * | 5/1994 | Fraas et al. ...................... 136/253 |
| 5,512,109 A | * | 4/1996 | Fraas et al. ...................... 136/253 |
| 5,772,793 A | * | 6/1998 | Ashcroft et al. ............... 136/253 |
| 6,372,979 B1 | * | 4/2002 | Streetman ...................... 136/253 |
| 7,640,931 B2 | | 1/2010 | Tarabishi |
| 7,741,557 B2 | * | 6/2010 | Cobb et al. ...................... 136/246 |
| 8,413,442 B2 | * | 4/2013 | Tarabishi ...................... 60/641.15 |
| 2003/0051991 A1 | * | 3/2003 | Santilli ........................... 204/164 |
| 2003/0230336 A1 | * | 12/2003 | Malfa et al. ...................... 136/253 |
| 2009/0272424 A1 | * | 11/2009 | Ortabasi ............. H01L 31/0547 136/246 |
| 2010/0170560 A1 | * | 7/2010 | Sapienza et al. ............... 136/246 |
| 2012/0042652 A1 | * | 2/2012 | Tarabishi ...................... 60/641.15 |
| 2014/0144483 A1 | * | 5/2014 | Jost ................................. 136/246 |

OTHER PUBLICATIONS

Ponnampalam, Dino, "Utilization of the Wider Solar Spectrum Using Thermophotovoltaic Cells", Energy Trend, Sep. 9, 2011, TrendForce Corp.
Walsh, Bryan, "Ocean's Dilemma", Time, Jun. 9, 2014, pp. 40-42.
(Continued)

*Primary Examiner* — Jonathan Johnson
*Assistant Examiner* — Bethany L Martin
(74) *Attorney, Agent, or Firm* — The Webb Law Firm

(57) ABSTRACT

A system for integrating and co-generating renewable energies which achieves a combined powerful AC/DC electricity output, includes an enclosed volume chamber having an inner surface including a plurality of thermophotovoltaic cells located thereon and an opening for admitting a condensed high-temperature solar energy beam. A heat absorbing member located within the chamber for receiving a portion of the solar energy beam and acts as a thermal storage as well as a thermal emitter to supply thermal energy to the thermophotovoltaic cells to create DC electricity. Air is fed into the chamber to capture thermal energy from the emitter and any waste thermal energy, which is then converted into AC electricity. The system relies on the power of simplicity using a new twist in solar physics to allow for the highest conversion of sunlight energy to electricity at zero carbon emission while occupying significantly less space than typical solar energy systems.

20 Claims, 6 Drawing Sheets

(56) References Cited

OTHER PUBLICATIONS

Lott, Melissa, C., "Secretary of Energy Sees a Critical Role for Energy Efficiency", Scientific American, May 29, 2013.
Nelder, Chris., "Turn Up the Juice: New Flywheel Raises Hopes for Energy Storage Breakthrough", Scientific American, Apr. 10, 2013.
McDonough, William, et al., "Can Soil Replace Oil as a Source of Energy?", Scientific American, Apr. 5, 2013, Excerpted from The Upcycle: Beyond Sustainability—Designing for Abundance, Apr. 16, 2013, North Point Press.
Biello, David, "How Much Will Tar Sands Oil Add to Global Warming?", Scientific American, Jan. 23, 2013.
Lehmann, Evan, et al., "Obama Warns Congress to Act on Climate Change, or He Will", Scientific American, Feb. 13, 2013.
Lott, Melissa, C., "Everything is (Old/New) Energy", Scientific American, Feb. 12, 2013.
"Black-body radiation", Feb. 14, 2015, http://en.wikipedia.org/wiki/Black-body_radiation.
Boriskina, Svetlana, V., et al., "Exceeding the solar cell Shockley-Queisser limit via thermal up-conversion of low-energy photons", Department of Mechanical Engineering, Massachusetts Institute of Technology, Oct. 21, 2013, Cambridge, MA, US.
Bryce, Robert, "Dreaming the Impossible Green Dream", The Wall Street Journal, Jun. 13-15, 2014, p. 14.
"Thermophotovoltaic", Jul. 23, 2014, http://en.wikipedia.org/wiki/Thermophotovoltaic.
Fan, Shanhui, et al., "Ultra-High Efficiency Thermophotovoltaic Solar Cells Using Metalic Photonic Crystals as Intermediate Absorber and Emitter", Global Climate & Energy Project, Stanford University, Feb. 2009.
"Thermophotovoltaic Cells", Jun. 25, 2014, http://www.theecoexperts.co.uk/thermophotovoltaic-cells.
"Thermo-Photo-Voltaic Cell", 2008, pp. 1-8, COMSOL.
Lombardo, Tom, "Solar Thermophotovoltaic Cells Can Generate Electricity at Night", Jan. 26, 2014, Engineering.com.
Blatchley, Charles, C., "Thermophotovoltaic (TPV) Power Conversion", Aug. 4, 2014, pp. 1-4, http:www.pittstate.edu/department/physics/faculty/blatchley/thermophotovoltaic.dot.
Parton, Els, et al., "How to Make ThermoPV Cost-Affordable", Copyright Notice 2004-2007, http://www.interpv.net/tech/tech_view.asp?idx=3238_code=020080036&page=4.
Moskvitch, Katia, "New State of Light Revealed with Photon-Trapping Method", livescience, May 1, 2014, http://www.livescience.com/45287-how-to-trap-light.html.
"Imec significantly reduces cost of geranium-based thermophotovoltaic cells", ScienceDaily, Jun. 9, 2010, http://www.sciencedaily.com/releases/2010/06/100609094359.htm.
"Thermo PV", JX Crystals, Copyright 2012, http://jxcrystals.com/drupal/thermopv.
Rumyantsev, V.D., et al., "Structural Features of a Solar TPV Systems", 6th Conference on Thermophotovoltaic Generation of Electricity, Jun. 2004, Freiberg, Germany.
Martin, James, II, "Solar Thermophotovoltaic breakthrough from MIT: Harnessing both light and heat for electricity", New Technologies, Solar Choice News, Jan. 21, 2014.
Levitan, Dave, "Thermophotovoltaic Device Has Potential to Reach Huge Solar Efficiencies", IEEE Spectrum, Jan. 20, 2014.
"Oil-Powered Thermo-Photo-Voltaics (TPV)", Oil Heat Manufacturers Association, Jun. 1999.
Andreev, V.M., et al., "Solar Thermophotovoltaic Converters: Efficiency Potentialities", 6th Conference on Thermophotovoltaic Generation of Electricity, Jun. 2004, Freiberg, Germany.
Dahlquist, Erik, et al.; "Combined Solar Power and TPV", World Renewable Energy Congress 2011—Sweden May 8-13, 2011, Linkoping, Sweden, pp. 2714-2721.
Hordeski, Michael., "New Technologies for Energy Efficiency", 2003, p. 215, The Fairmont Press, Inc.
Exell, R.H.B., "Principles of Solar Thermal Conversion", King Mongkut's University of Technology Thonburi, 2000.

\* cited by examiner

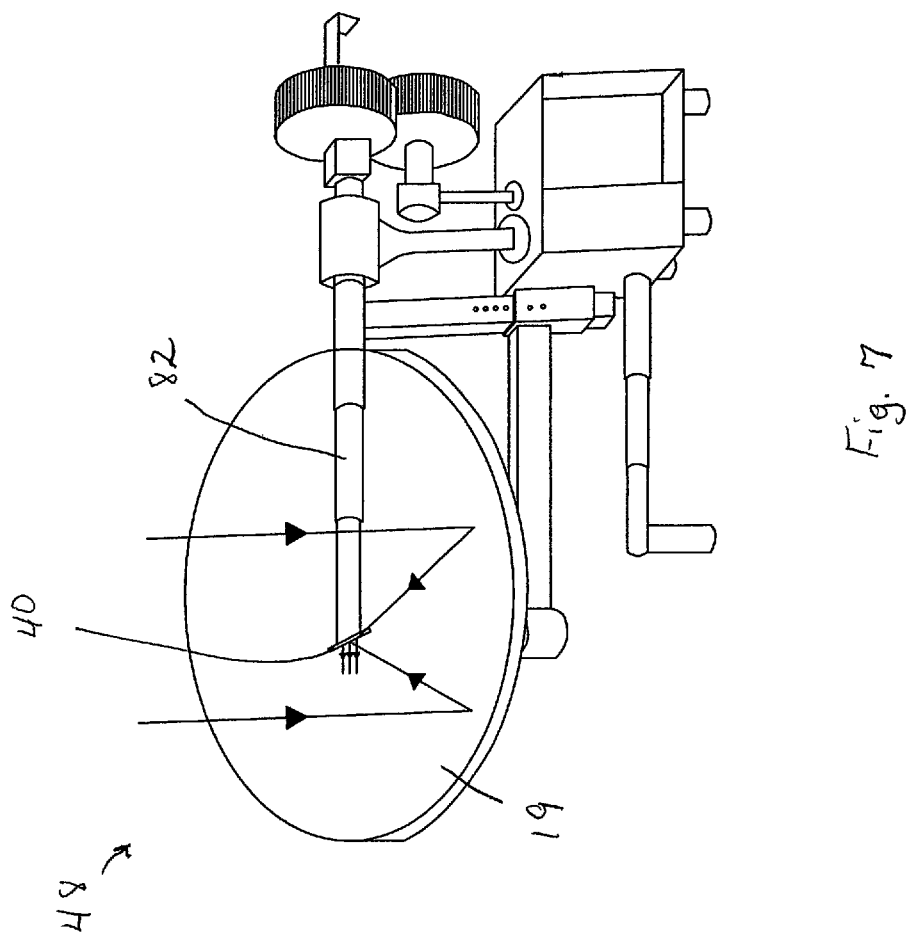

ULTIMATE RENEWABLE SOLAR ENERGY AND STORAGE SYSTEM

CROSS-REFERENCE TO RELATED APPLICATION

This application claims priority from U.S. Provisional Patent Application No. 61/998,754, filed Jul. 8, 2014, which is incorporated herein by reference.

BACKGROUND OF THE INVENTION

1. Field of the Invention

The invention relates generally to an apparatus for converting solar energy into a usable energy product and, more particularly, to an economical system for converting a high percentage of sunlight radiant energy to electricity with negligible optical losses utilizing thermophotovoltaic cells. The system simultaneously produces both AC and DC electricity on a sustainable cycle with zero carbon emission.

2. Description of Related Art

Solar energy has been available as a source of power for more than 4.5 billion years. For centuries, inventors have been devising various means to harness this energy. As far back as the third century B.C., records indicate that the Greek and Roman armies used "burning mirrors" to focus sunlight as weapons of war to ignite fires and to burn sails of enemy warships.

Solar energy provides the world either directly or indirectly with the majority of its energy. Solar energy is a renewable energy source having vast potential. Although solar energy is abundant, a major drawback is that it is diffuse and not available at all hours. Solar energy can be affected by the time of the day, the seasons, and the changing sun path in the sky as the earth's axis is not at a right angle to the sun but it is tilted away at an angle of 23.5°.

For decades, inventors have tried various systems for harnessing this incredible energy source. For example, U.S. Pat. Nos. 3,988,166; 4,286,581; 5,275,149 and 4,038,971 have sought to control and convert this energy into a cost-effective usable form. Unfortunately, these systems are cumbersome, expensive to manufacture and maintain, expensive to operate, and yield little in terms of usable, convertible energy.

The article entitled "Principles of Solar Thermal Conversion" by R. H. B. Exell, 2000. King Mongkut's University of Technology Thonburi also discusses, in terms of academic interest only, of trapping solar radiation in an enclosed volume with perfectly reflecting walls at the temperature of the sun, i.e., approximately 5800 K and the need for a parabolic concentrator that focuses direct solar radiation into the enclosed volume. The article further discusses that if solar energy were to be used on a large scale, since solar energy is theoretically a very high temperature resource, one should try to harness it at this very high temperature for efficient conversion and then use the waste heat for low temperature purposes instead of downgrading the solar energy with low temperature collectors at the start. This article recites a theory for what is desired in this technology, but provides no direction as to how it can be achieved.

U.S. Pat. No. 7,640,931 to Tarabishi (hereinafter, "the '931 patent"), the entirety thereof being incorporated by reference thereto, is directed to a solar collecting system which can concentrate or condense solar energy at a fixed, stationary focal point to economically harness the sun's energy into a manageable and convertible form as desired in the Exell article. In particular, the '931 patent teaches a system for tracking the sun and maintaining a constant fixed focal point or sub-focal point to at least partially condense the sun's rays into a high-energy beam that can be redirected to a predetermined location for generating electrical power, heat energy, steam, and the like.

U.S. Pat. No. 8,413,442, also to Tarabishi (hereinafter, the '442 patent"), the entirety thereof being incorporated by reference thereto, is directed to an economical system for harnessing the sun's energy collected from the system described in the '931 patent, storing this energy, and/or converting this energy into a mechanical and/or electrical energy product on a sustainable cycle. The system utilizes one or more enclosed volume chambers having a mirrored inner surface connected in series for trapping the heat therein, a source for feeding a first fluid into the chamber to convert this fluid into a high pressure source, an outlet for allowing the high pressure source to exit the chamber, and at least one turbine for converting the high pressure source into mechanical and electrical energy product. The enclosed volume chambers may or may not include a heat absorbing member located therein for trapping and storing the energy for use during sunless hours. The heat trapped within the chamber can reach a temperature as high as plasma level. The system is highly efficient in that it achieves almost 100% conversion of the solar energy into a usable format and has increased efficiency through the use of multiple integrated units which are compact in size and space compared to previously used systems.

Photovoltaic cells are used to convert light into electricity. Thermophotovoltaic cells use different technology to produce electricity. "Thermo" means heat and therefore these cells convert heat into electricity. Thermophotovoltaic cells use semiconductors, which are designed for specific wavelength, invisible light, like infrared rays, released by hot objects. This way of generating electricity is very neat and clean. Another advantage to the use of thermophotovoltaic cells is that they do not require much maintenance to work and do not produce any by-product that can harm the environment. For this reason, thermophotovoltaic cells are "clean" sources of energy.

The article entitled "Utilization of the Wider Solar Spectrum Using Thermophotovoltaic Cells" by Dr. Dino Ponnampalam recognizes that thermophotovoltaic cell technology may be a way to harness solar energy without actually utilizing direct sunlight to meet the ever-increasing demand for energy without depleting the earth's natural resources. Since thermophotovoltaic cell systems match the band gap in the near infrared (0.078-3 micrometers), whereas the sun emits radiation that spans the entire electromagnetic (EM) spectrum, an interesting point to note is that the majority of the sun's irradiance is in the infrared region, making exploitation of this region, and this technology extremely worthwhile. As noted by Dr. Ponnampalam, the drawback of efficiency conversion of thermophotovoltaic cell technology has prevented a roll out of this technology. Dr. Ponnampalam further notes that currently there is no single piece of solar energy technology that could fully harness the power of the sun in providing and sustaining the power demands of society; however, through the intelligent utilization of the technology available, it is indeed feasible that solar energy could meet the energy demands of the world.

The present invention is directed to a system that utilizes thermophotovoltaic cell technology in an efficient and cost-effective manner. The system is capable of converting up to 95% of sunlight radiant energy to electricity simultaneously producing AC and DC energy using the proper level of condensed solar energy temperature. The system uses the power of simplicity to exploit the broad spectrum of the harnessed solar energy resulting from the design of the '931 patent and uses it in a creative way. The system of the present invention is self-sustaining, achieving a powerful AC and DC electricity combined output with the highest energy intensity per space unit, allowing the highest conversion of sunlight energy across the entire spectrum to electricity at zero carbon emission. Additionally, the present invention utilizes a creative way that relies upon a combination of diverse frequencies of thermophotovoltaic cells to generate DC electricity and, from waste heat to generate AC electricity, as well as from direct condensed solar beams to also generate AC electricity all from the same source of solar energy, and is capable of storing energy for several weeks, all in a single system. A full implementation of all of the system stages would result in a cost of kwh of less than one cent, making carbon capture and storage affordable.

SUMMARY OF THE INVENTION

The above two systems disclosed by U.S. Pat. Nos. 7,640,931 and 8,413,442 to Tarabishi, the inventor of the present invention, represent a breakthrough regarding the Bose-Einstein condensate hypothesis "BEC" 1924 which scientists considered impossible to create. The above two inventions highly condense solar light, trap accumulated photons in an enclosed chamber, and keep photons from escaping under realistic conditions.

The system of the present invention represents several breakthroughs in the solar industry as it combines the power of simplicity and a new twist in solar physics and applies it to the complex issue of solar energy to allow for the highest conversion of sunlight energy to electricity at zero carbon emission while occupying a fraction of the space required to operate typical photovoltaic solar energy systems. The system of the present invention has minimal optical losses and is able to use thermophotovoltaic cell technology in an efficient and cost-effective manner to convert the sun's energy into electricity. In theory, it is possible to convert 95% of sunlight radiant energy to electricity (Helmholtz ratio). Creative integration involves the above two renewable energies using the same source of concentrated broad spectrum of solar energy beams simultaneously, to directly and indirectly excite massive solar cells covering the inside wall of an enclosed chamber to generate DC electricity, with or without photon filters, while at the same time inject ambient air into the chamber, which would produce a mild expansion pressure sufficient to drive the thermal energy inside the enclosed chamber and pass it into a turbine to generate AC electricity. The system of the present invention would generate the highest energy per space unit and even has potential for use in space, such as on the moon, to extract Helium 3 and for building shelters. The system occupies a small space in comparison to traditional photovoltaic systems.

According to a first aspect, the invention is directed to an apparatus for storing and/or converting solar energy into a mechanical and/or electrical energy product. The apparatus includes an enclosed volume chamber having an inner surface including a plurality of thermophotovoltaic cells located thereon, at least one opening, which may be a one-way opening, extending through a wall of the chamber for admitting a condensed high-temperature solar energy beam into the chamber, a heat absorbing member located within the chamber for receiving at least a portion of the solar energy beams and emitting or radiating heat energy to the thermophotovoltaic cells. A first conversion device is associated with the thermophotovoltaic cells for converting the heat energy into electrical energy. The heat absorbing member can be a black body that is placed in the center of the enclosed chamber and acts as both a thermal storage and a thermal emitter. The apparatus also includes at least one inlet extending through the wall of the chamber for feeding air into the chamber and/or into the black body wherein the air becomes heated, at least one outlet for allowing the heated air to exit the chamber, and a second conversion device configured for cooperating with the outlet for receiving the heated air and for converting the heated air to mechanical and/or electrical energy.

The heat energy applied to the thermophotovoltaic cells causes the cells to become excited and the first conversion device comprises a wiring system associated with the thermophotovoltaic cells for carrying the DC energy away from the cells. The second conversion device, which is separate from the first conversion device, can be a turbine connected to a generator for converting the heated air into AC electricity. Also, the DC electricity produced from the first conversion device can be converted to AC electricity which is then joined with the AC electricity generated from the turbine.

The heat absorbing member is capable of storing at least a portion of the heat energy for heating the air fed into the chamber. The heat absorbing member can have various sizes depending upon the desired electrical output. The chamber can include an open space containing air located between the inner surface of the chamber wall and the heat absorbing member. In addition to the absorbed heat of the heat absorbing member, a portion of the condensed high energy solar beam that enters into the chamber can heat the air contained within the open space as well as the air fed into the chamber.

A cooling tunnel is provided, which extends about an outer surface of the chamber for cooling the back surface of the thermophotovoltaic cells. The cooling tunnel includes at least one inlet and one outlet opening for cycling cooling air or a cooling material, such as liquid nitrogen, through the cooling tunnel.

According to one embodiment, the thermophotovoltaic cells can be formed from gallium antimonide or germanium; however, any known material can be used to form the thermophotovoltaic cells. The plurality of thermophotovoltaic cells can comprise an array formed from multiple frequency cells to capture rays emitting along the entire spectrum. The array can produce at least 5-6 watts per square centimeter. The thermophotovoltaic cells can have an operating temperature within the range of 900-1200° C.

The air fed into the chamber can be a low pressure air source at ambient temperature as long as the air has sufficient force to drive the thermal energy out of the chamber to the turbine. Also, the thermophotovoltaic cell array can be formed from a net comprising a series of thermophotovoltaic cells having side edges which are interlocked within a plurality of frames covering the entire inside surface of the enclosed chamber shell facing the heat absorbing member. According to one embodiment, this net can form the outer surface of the chamber.

According to one embodiment, the heat absorbing member can be formed from a combination of heat absorbing materials having differing heat capacity levels, and the chamber is capable of storing heat energy for up to several weeks, or even several months, depending upon the rate of depletion and/or the amount of usage of the heat energy as well as the size of the heat absorbing member (black body/emitter).

The condensed solar energy beam can be supplied from a solar collecting system comprising a parabolic solar collector panel configured for reflecting solar rays to one of a focal point and a sub-focal point to at least partially condense the rays and at least one deflecting mirror mounted at one of the focal point and sub-focal point for receiving the condensed rays and redirecting the rays as a condensed solar energy beam to the enclosed chamber.

A heat sensor can be provided for monitoring the temperature level of the enclosed volume chamber. The heat sensor can be in communication with a power source for moving the at least one deflecting mirror from the focal point to interrupt the feed of the solar energy beam into the chamber at a given time and to control the amount of heat absorbed by the chamber and/or for increasing the airflow entering into the chamber. The amount of heat fed to the chamber can be depleted as needed such that the amount of heat absorbed by the chamber is maintained at a temperature that is below the melting point of the material forming the heat absorbing member.

According to one embodiment, the enclosed chamber can include at least two openings for receiving a solar energy beam into the chamber and wherein the openings include a one-way mirror and/or a divergent mirrored edge.

A plurality of enclosed volume chambers can be provided in series and the stored thermal energy can be fed to a second of the series of enclosed volume chambers to enable the subsequent enclosed volume chamber to increase and/or maintain a predetermined level of heat energy in the second chamber.

According to another aspect of the invention, an apparatus for converting solar energy simultaneously into AC and DC electricity includes a chamber having an inner surface including a plurality of thermophotovoltaic cells located thereon. At least one opening extends through a wall of the chamber for admitting a condensed high-temperature solar energy beam into the chamber. A heat absorbing member is located within the chamber for absorbing at least a portion of the solar energy beam and emitting heat to the thermophotovoltaic cells. The apparatus further includes a first conversion device in the form of a wiring system associated with the thermophotovoltaic cells for carrying DC electricity away from the cells and a second conversion device for converting the heat absorbed by the heat absorbing member and the waste heat into AC electricity.

This system is self-sustaining and would achieve a combined powerful AC/DC electricity output, allowing the highest conversion of sunlight energy to electricity at a zero carbon emission. Efficiency becomes of no concern. Full implementation of all of the system stages, results in the cost of kwh to be less than one cent, which would make carbon capture and storage affordable, as well as water distillation and hydrogen production. Widespread use of the system will significantly contribute to the fight against global warming and the greenhouse effect, provide cheap carbon free chemical fuel, and solve the clean water shortage. A third industrial revolution is possible using solar energy.

BRIEF DESCRIPTION OF THE DRAWINGS

FIG. 7 shows a perspective view of a solar collector panel according to yet another design wherein the deflecting mirror is mounted onto a retractable scope.

DESCRIPTION OF THE INVENTION

Figure 1:
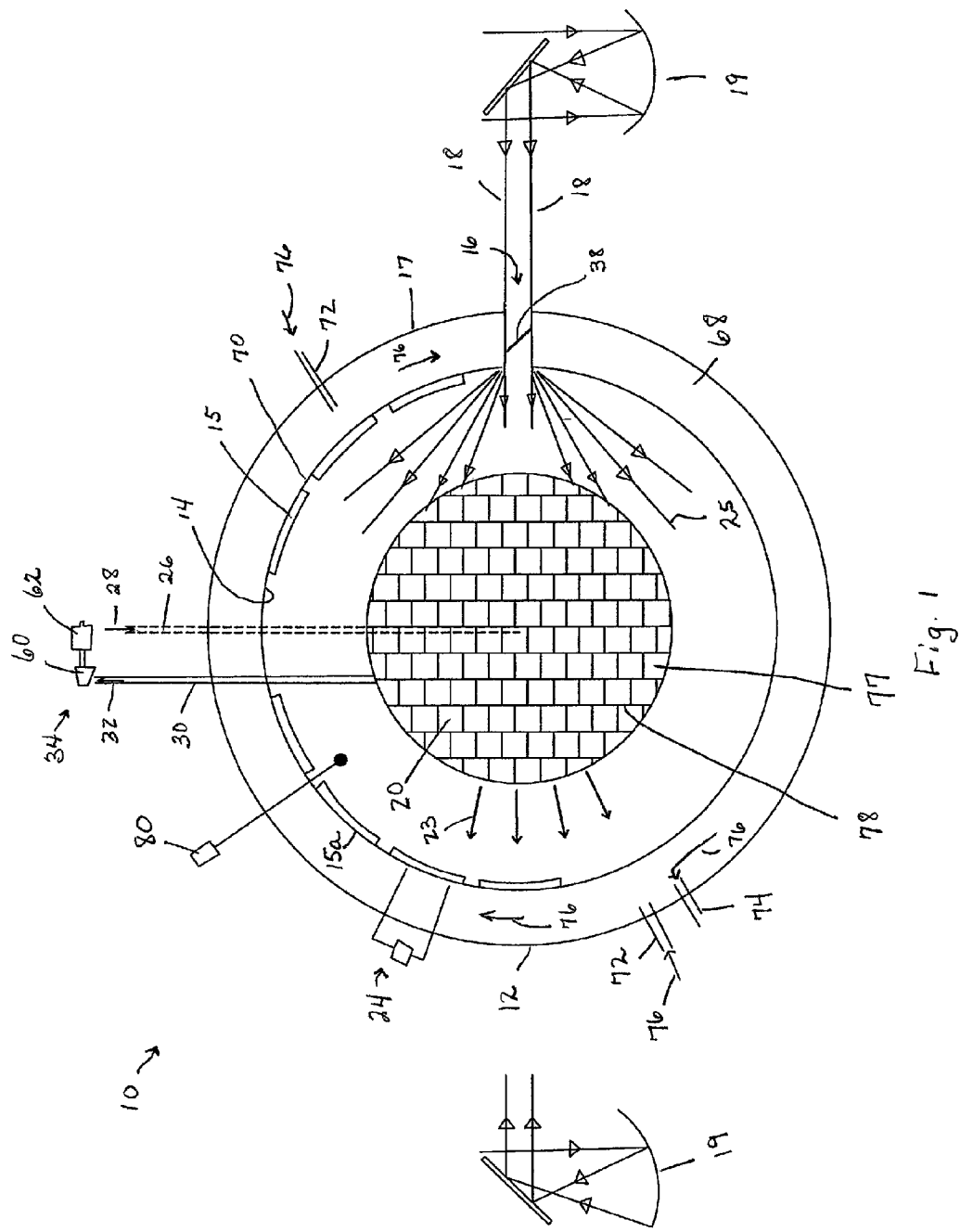
FIG. 1 shows a schematic top open view of an apparatus for converting solar energy into a mechanical and/or electrical energy product including an enclosed chamber in combination with a sustainable energy supply system according to an embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
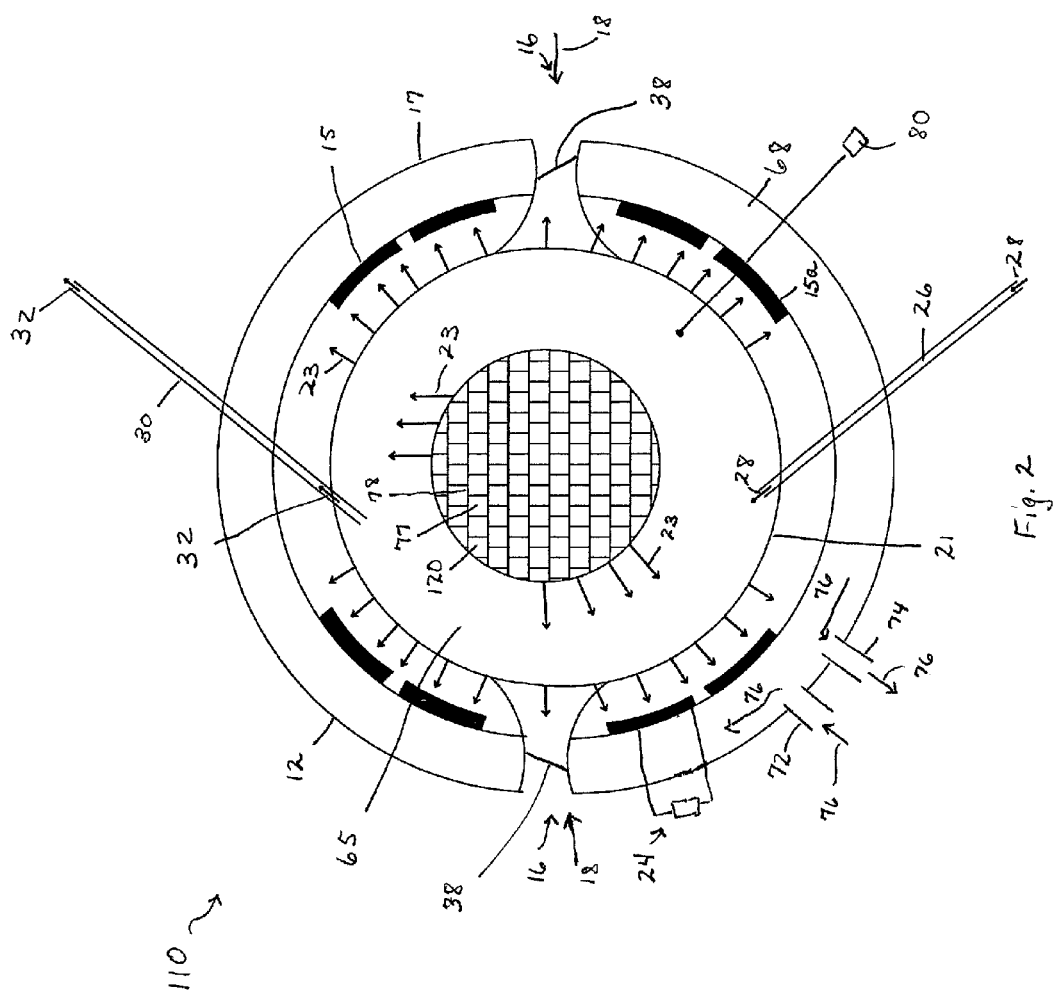
FIG. 2 shows an expanded top view of the enclosed chamber of FIG. 1 for converting solar energy into a mechanical and/or electrical energy product.
Figure 3:
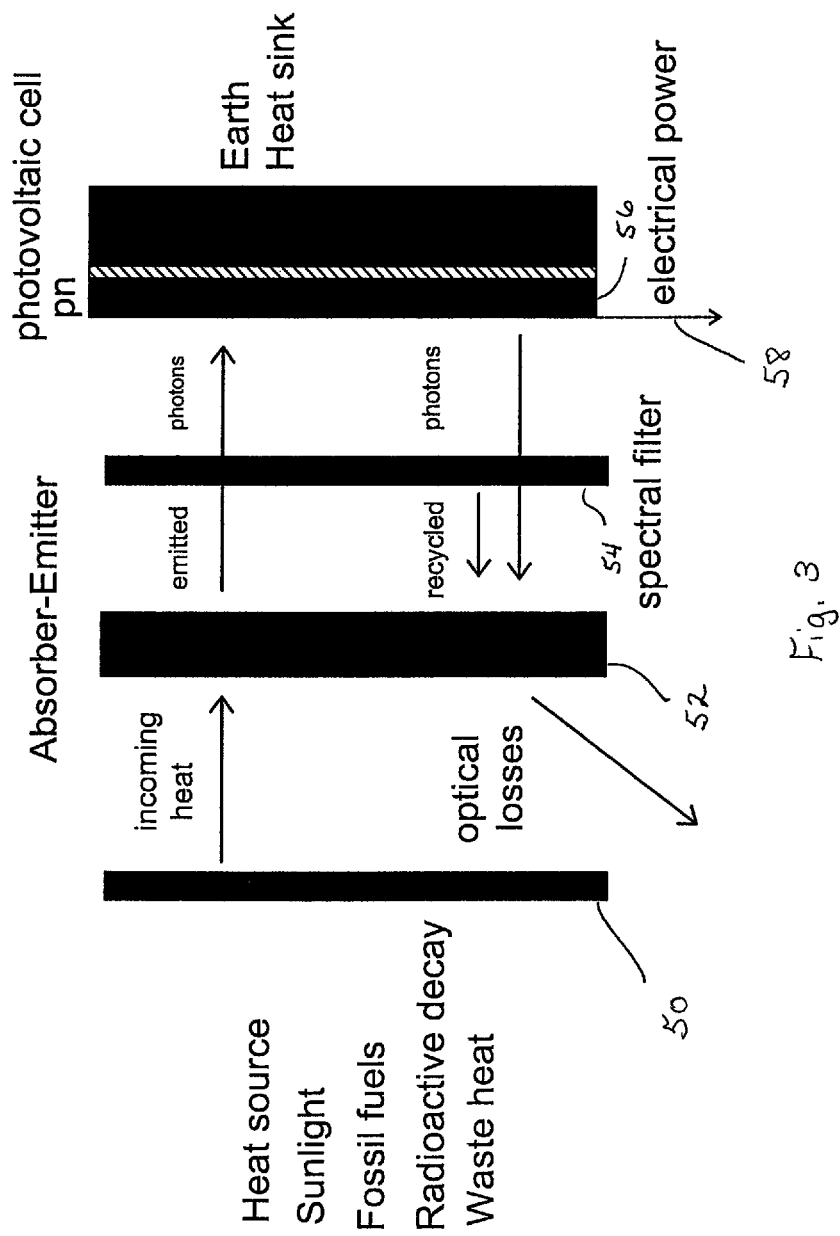
FIG. 3 shows a schematic representation of a thermophotovoltaic cell which can be used in the solar energy converting apparatuses of FIGS. 1 and 2.
Figure 4:
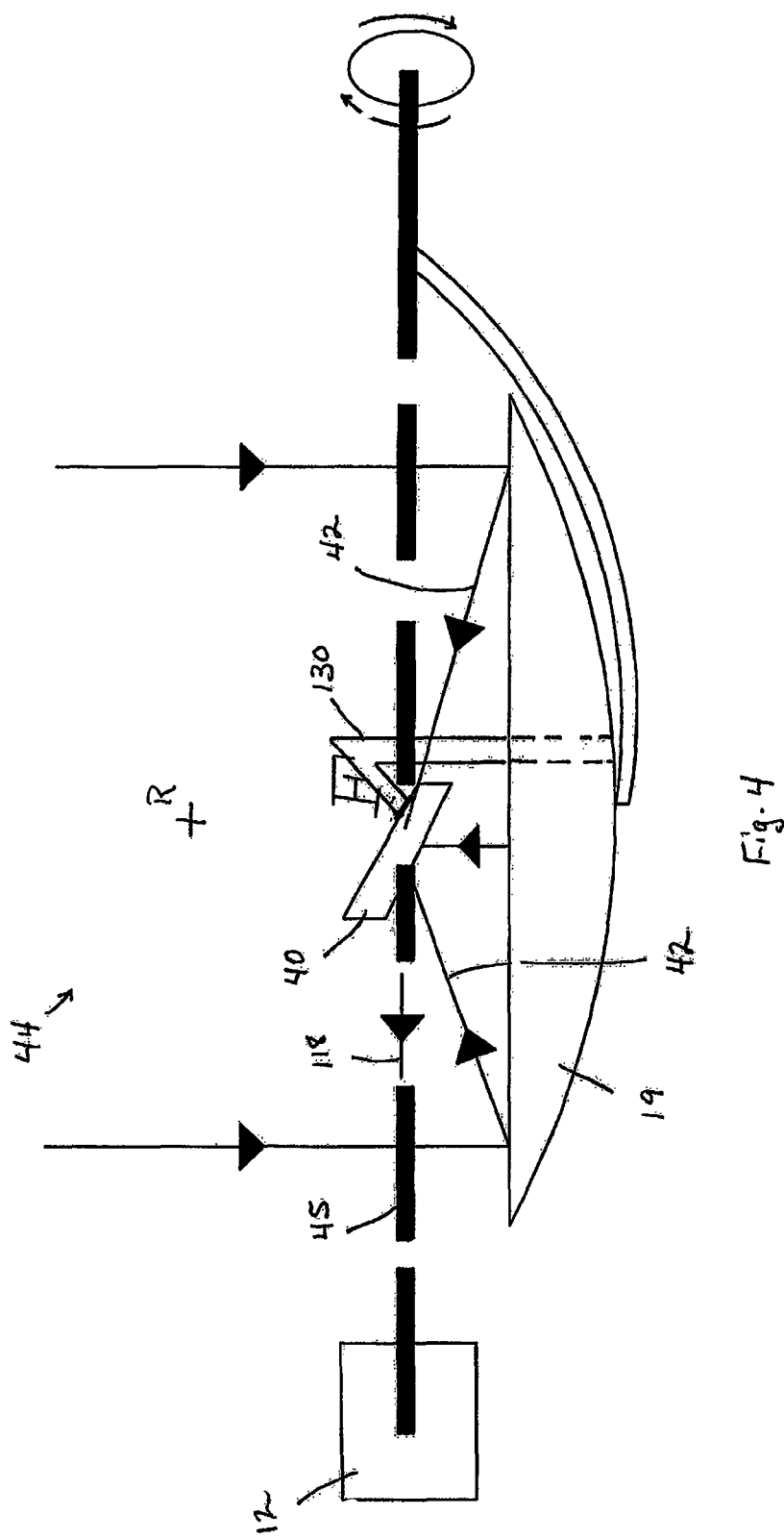
FIG. 4 shows a solar collector panel according to one design, having a fixed, stationary focal point, which can be used to supply solar energy to the apparatus/system of the present invention.
Figure 5:
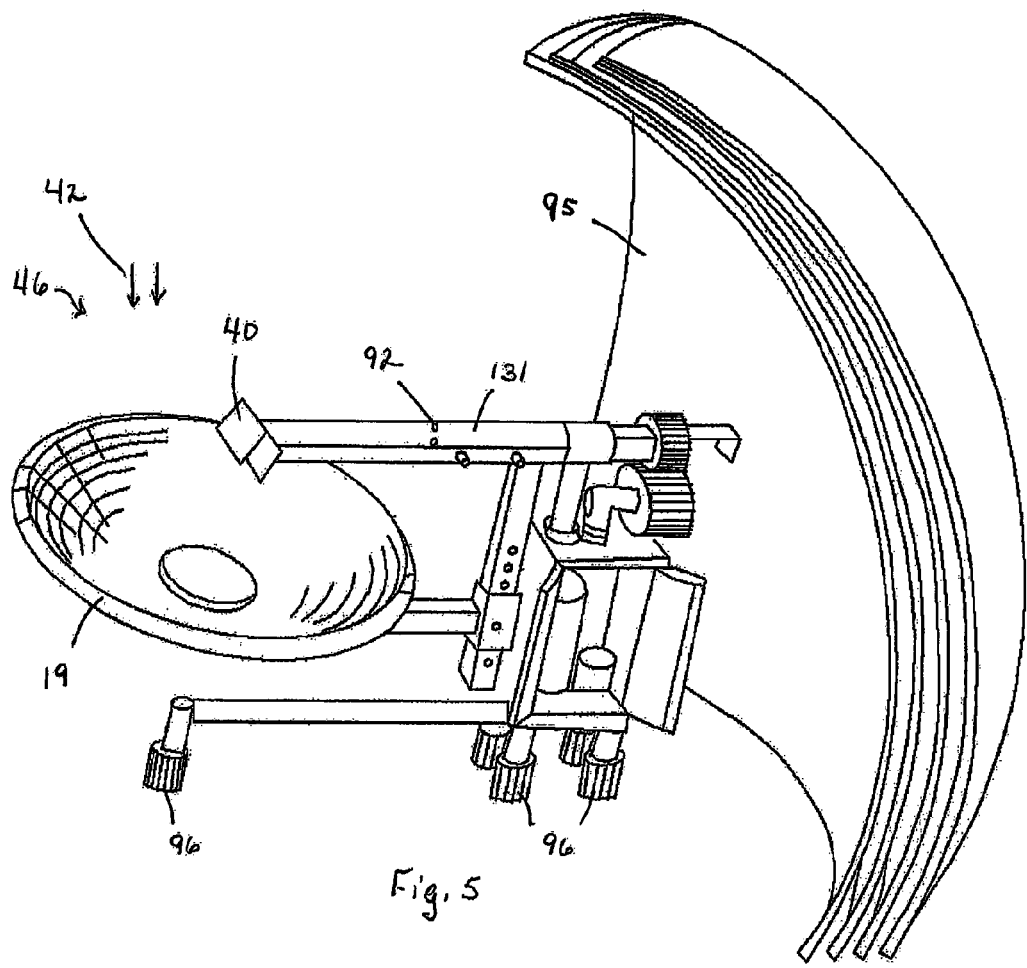
FIG. 5 shows a solar collector panel according to another design, having a fixed, stationary focal point, which can be used to supply solar energy to the apparatus/system of the present invention and including a retractable protective shelter for guarding against bad weather.

Reference is now made to FIGS. 1 and 2 which show schematic side elevation views of an apparatus, generally indicated as 10, 110, according to a first embodiment and a second embodiment, for converting solar energy into a mechanical and/or electrical energy product. The apparatus 10, 110 comprises an enclosed volume chamber 12 formed from a shell which can have a spherical or oval shape. A portion of the shell or chamber 12, such as a top portion, can be removed to allow for access to the interior portion of the chamber 12 for maintenance and/or modification of the components contained therein. The chamber 12 has an inner surface 14 which is lined with a plurality of thermophotovoltaic cells 15. According to one embodiment, the thermophotovoltaic cells 15 can have edge portions that abut one another in a "frame" arrangement wherein the thermophotovoltaic cells 15 are held in an interlocking arrangement within a series of frames 27 which at least partially lines the inner surface 14 of the chamber 12. This interlocking "frame" arrangement can form a net extending about the heat absorbing member, leaving at least one window or opening 16 to allow rays 18 to enter therethrough. According to a further embodiment, the thermophotovoltaic cells 15 line the entire inner surface 14 of the chamber 12. An example of a thermophotovoltaic cell is shown in FIG. 3 and is described in more detail below. The chamber 12 can include at least one first opening, generally indicated as 16, which extends through a wall 17 of the chamber 12 for admitting condensed high-temperature solar energy beams 18 fed from a parabolic solar collector panel 19 into the chamber 12. Examples of parabolic solar collector panels are shown in FIGS. 4, 5, and 7 and are described in more detail below.

With continuing reference to FIGS. 1 and 2, a heat absorbing member 20, 120 is located within the chamber 12 for receiving at least a portion of the solar energy beams 18 and emitting heat energy, shown by 23, to the thermophotovoltaic cells 15. The embodiment shown in FIG. 2 differs from that shown in FIG. 1 in that the heat absorbing member 120 of FIG. 2 is smaller in size than the heat absorbing member 20 shown in FIG. 1, increasing the distance from the thermophotovoltaic cells 15. It can be appreciated that various sizes of heat absorbing members 20, 120 may be used in the apparatus 10, 110 of the invention depending upon the amount of electricity production required. It can also be appreciated that the size of the heat absorbing member 20, 120 affects the amount of thermal energy held therein and, depending upon the material used to form the thermophotovoltaic cells 15, will determine the size of heat absorbing member 15 needed for heat absorption. The apparatus 10 also includes a first conversion device, generally indicated as 24, associated with the thermophotovoltaic cells 15 for converting the heat energy into electrical energy. The heat absorbing member 20 can be a black body that is placed in the center of the enclosed chamber 12 and acts as both a thermal storage and a thermal emitter. The apparatus 10 also includes at least one inlet 26 extending through the wall 17 of the chamber 12 for feeding air 28 into the chamber 12 wherein the air becomes heated. At least one outlet 30 is provided for allowing heated air 32 to exit the chamber 12. A second conversion device, generally indicated as 34 can be provided which is configured for cooperating with the outlet 30 for converting the heated air 32 to mechanical and/or electrical energy.

Reference is now made to FIG. 3 which shows a schematic representation of one example of a thermophotovoltaic cell which can be used in the solar energy converting apparatuses 10, 110 of the invention. Thermophotovoltaic systems convert heat energy into electricity via photons and consist of, at a minimum, an emitter and a photovoltaic cell power converter. However, most thermophotovoltaic systems include additional components, such as concentrators, filters, and reflectors. Thermophotovoltaic systems generate electricity by electromagnetic frequency at high temperatures and high frequencies. The basic principle of operation is similar to that of traditional photovoltaics where a p-n junction is used to absorb optical energy, generate and separate electron hold pairs, and in doing so, convert that energy into electrical power. As shown in FIG. 3, the thermophotovoltaic cell requires a heat source 50, which can be sunlight, fossil fuels, radioactive decay, waste heat, and the like. In the present invention, this heat source 50 is provided from the condensed high-temperature solar energy beams 18 fed from the parabolic solar collector panel 19 into the chamber 12. An absorber/emitter 52 is provided which absorbs the heat and emits or radiates the heat to a photovoltaic cell 56.

In the present invention, the absorber/emitter 52 corresponds to the heat absorbing member 20, 120 and the heat energy emitted to the photovoltaic cell corresponds to 23 as shown in FIGS. 1 and 2. For the emitter, deviations from perfect absorbing and perfect blackbody behavior lead to photon losses. For the case of selective emitters, any light emitted at wavelengths not matched to the band gap energy of the photovoltaic cells may not be efficiently converted and leads to reduced efficiency. To minimize these losses, it is important to select an emitter formed from a material that has a narrow wavelength range, i.e., band gap, so as to minimize the heat loss. One way to optimize the performance of the emitter is to form the blackbody or heat absorbing member 20, 120 from a variety of materials having a series of wavelengths. Examples for forming the heat absorbing member 20, 120 or emitter include, but are not limited to, polycrystalline silicon carbide, tungsten, rare-earth oxides, such as ytterbium oxide and erbium oxide, and photonic crystals. A spectral filter 54 can be provided to reflect non-ideal wavelengths back to the emitter. Since these filters 54 are rarely perfect, any light that is absorbed or scattered and not redirected to the emitter or the converter is lost. However, because the present invention utilizes an enclosed chamber 12 along with the feeding of ambient air 28 into the enclosed chamber 12, any lost energy from the scattered or non-redirected light is recovered and converted into electricity via the second conversion device 34. Additionally, the present invention can include a photon filter 21 within the chamber 12, as shown in FIG. 2, and located around the heat absorbing member 20, 120 to further optimize the performance of the thermophotovoltaic cells 15. In this embodiment, the temperature within the chamber 12 must be maintained below the melting point of the photon filter 21. Photon filters are typically made of glass and can have varying melting point temperature depending upon the particular material used to form the glass. According to a further embodiment, the photon filter 21 can be comprise a series of retractable/extendable panels, similar to the retractable/extendable panels forming the protective shelter 95 shown in FIG. 5.

The thermophotovoltaic system of the present invention consists of both thermal and photovoltaic energy and offers improvements of both, as a whole, since the thermal radiation, which occurs mostly in the infrared region, and the photovoltaic energy are both trapped in the enclosed chamber at the same time. In photovoltaic cells, the photons are in the range of 0.4-0.8 µm mostly, while in thermophotovoltaic cells the wavelengths can be extended up to approximately 1.9 µm. The thermophotovoltaic system of the present invention has the potential to generate current densities close to 300 times that of traditional photovoltaic systems alone. Utilizing advanced arrays having multi-frequency cells can potentially produce well over 6 watts of electric power per square centimeter of the photovoltaic cell surface area in addition to the AC electricity generated by the waste heat that has been continuously trapped in the enclosed chamber 12.

As the emitter 20, 120 temperature increases and the radiation temperature increases, the radiation shifts to a shorter wavelength allowing for more efficient absorption by the thermophotovoltaic cells 15. Optimum emitter temperature is 1600-1800° C. For example, polycrystalline silicon (CID) is extremely cheap; however, much of its energy is in the long wavelength. In the system of the present invention, this material can still be used among other materials since any waste heat resulting from the long waves can be used with no loss of photons because these lost photons are trapped in the enclosed chamber.

According to one embodiment, the thermophotovoltaic cells 15 can be formed from gallium antimonide or germanium; however, any known material can be used to form the thermophotovoltaic cells. These other materials include silicon, indium gallium arsenide antimonide, indium gallium arsenide, and indium phosphide arsenide antmonide. The cut off wavelength and corresponding band gap for different materials are provided in the following table. Silica (Si) with a cut off at 1.1 µm is good for visible light but not for longer wavelengths. GaSb and InGaAs are better flying cut offs suitable for thermophotovoltaic cells.

TABLE

Cut off and threshold energy for different materials

|  | Cut off wavelength | Band Gap |
| --- | --- | --- |
| Si: | 1.1 µm | 1.12 eV |
| GaSb: | 1.7 µm | 0.72 eV |
| InGaAs: | 2.3 µm | 0.55 eV |
| InGaAsSb | 2.4 µm | 0.53 eV |

The cut-off means that photons with a wavelength higher than the cut-off are filtered off, while those with short wavelengths are passing through to the photovoltaic cell. Accordingly, the same amount of electricity can be produced with a surface area of around 100 times smaller than used for conventional photovoltaic cells. To optimize the potential of the system, the thermophotovoltaic cells can comprise an array formed from multiple frequency cells to optimize efficiency while considering the price of the materials to form the thermophotovoltaic cells. The thermophotovoltaic cells can have an operating temperature within the range of 900-1200° C.

The heat energy 23 applied to the thermophotovoltaic cells 15 causes the cells to become excited and the first conversion device 24 can include a wiring system, generally indicated as 58 in FIG. 3, associated with the photovoltaic cell 56 of the thermophotovoltaic cell 15 for converting the excited cells into DC electricity.

Referring back to FIGS. 1 and 2, the second conversion device 34 can be a turbine 60 connected to a generator 62 for converting the heated air 32 into AC electricity. The air 28 fed into the chamber can be a low pressure air source at ambient temperature as long as the air has sufficient force to drive the thermal energy out of the chamber 12 to the turbine 60. The outer surface 17 of the chamber can be formed from a poorly conductive, insulated material.

According to one embodiment, the heat absorbing member 20, 120 can be formed from a combination of heat absorbing materials having differing heat capacity levels, and the chamber 12 is capable of storing heat energy for up to several months, depending upon the rate of depletion and the continuous recharging and/or the amount of usage of the heat energy. In addition to the materials discussed above, the heat absorbing member or emitter 20, 120 can be formed from a combination of heat absorbing materials, such as cast iron, magnesium, mixed ceramic material, concrete, and the like, having differing heat capacity levels and differing heat conductive properties. According to one design, the heat absorbing member 20, 120 can be formed as a series or block of bricks 77 which are positioned with spacing 78 therebetween to increase the exposed surface area of the bricks 77. The air 28 fed into the chamber 12 can be ambient air, which is injected into the spacing between the bricks 77 within the block and moves through the spaces 78 between the bricks 77 so that the air 28 quickly contacts the surface areas of the solar heated bricks 77 and quickly heats up. The chamber 12 and its contents are capable of storing heat energy for up to several months depending upon the rate of depletion and/or the amount of usage of the heat energy and the size of the storage/chamber 12. This would be desirable in areas of the world where there are prolonged periods where sunlight is absent or there is very low sun intensity.

The heat absorbing member 20, 120 is capable of storing at least a portion of the heat energy supplied by the solar beams 18 for heating the air 28 fed into the chamber. As stated above, the heat absorbing member 20, 120 can have various sizes depending upon the desired electrical output. The chamber 12 can include an open space 65 containing air located between the inner surface 14 of the chamber wall 17 and the heat absorbing member 20, 120. In addition to the absorbed heat of the heat absorbing member transmitting heat energy 23, a portion of the condensed high energy solar beams 18 that enter into the chamber 12 can be used to transmit heat energy 25 to heat the air contained within the open space 65 and to heat the air 28 fed into the chamber 12.

A cooling tunnel 68 can be provided which extends about an outer surface of the inner wall 14 of the chamber 12 for cooling a back surface 15a of the thermophotovoltaic cells 15.

The cooling tunnel 68 includes at least one inlet 72 and one outlet opening 74 for cycling cooling air or a cooling material 76, such as liquid nitrogen, through the cooling tunnel 68. It can be appreciated that multiple outlet openings 74 can be provided and that the outer wall 68a forming the cooling tunnel 68 does not have to be air tight.

The opening 16 into the enclosed volume chamber can comprise a one-way mirror 38 on the north or the south side of the chamber to allow one-way entrance of the solar beam. Also, the heat trapped within the chamber should not exceed 2000° C., which is below the melting point of the material forming the head absorbing member 20, 120, and can be controlled by controlling the size of a solar collector deflecting mirror 40, as shown in FIGS. 4, 5, and 7, how long the solar energy is trapped in the chamber 12, and the continuation of solar energy inputted into the chamber 12 and/or into the heat absorbing member 20, 120.

Reference is now made to FIGS. 4, 5, and 7, which show different parabolic solar collector devices, generally indicated as 44, 46, and 48 including a solar collecting panel 19, which can be used to supply the condensed high-temperature solar energy beam 18 into the enclosed volume chamber 12. The solar collector devices 44 and 46 of FIGS. 4 and 5 are described in detail in U.S. Pat. No. 7,640,931 to Tarabishi. The solar collector device 46 of FIG. 5 includes a retractable/extendable protective shelter 95 which can be used to partially or fully shield the solar collector device 46. The parabolic solar collector panel 19 is configured for reflecting solar rays 42 to either a stationary fixed focal point F or a stationary fixed sub-focal point. At least one deflecting mirror 40 is mounted via mounting arm 130, 131 at one of the focal point and sub-focal point for receiving the rays 42 and redirecting the rays 42 as the condensed high-temperature solar energy beam 18 moves along an imaginary axis 45 to the enclosed volume chamber 12. The solar energy beam 18 can be deflected directly into the enclosed volume chamber 12 from the deflecting mirror 40 or it can be delivered by a cable (not shown), such as a fiber-optic cable having a lumen having an inside wall which is lined with highly reflective material. It can be appreciated that any other well-known device can be used for delivering the condensed high-temperature solar energy beam 18 to the enclosed volume chamber 12.

It can be appreciated that the stored thermal energy is capable of being fed to a second enclosed volume chamber, such as the enclosed volume chamber 12 as shown in FIG. 1, to enable this second enclosed volume chamber 12 to increase and/or maintain a predetermined level of heat energy therein.

With continuing reference to FIGS. 1 and 2, one or more heat sensors 80 can be provided in the chamber 12 for monitoring the temperature level of the enclosed volume chamber 12. This heat sensor 80 can be in communication with a power source (not shown) for moving the at least one deflecting mirror 40 from the focal point to interrupt the feed of the solar energy beam 18 into the chamber 12 at a given time and to control the amount of heat absorbed by the heat absorbing member 20, 120. Reference is made to FIG. 7, which shows the deflecting mirror 40 mounted onto a retractable scope 82, which can be retracted depending upon a sensed level of heat within the chamber 12 to move the deflecting mirror away from the focal point to reduce or interrupt delivery of solar energy into the chamber 12. The amount of heat fed to the chamber 12 can be depleted as needed and/or the amount of energy fed therein can be controlled by movement of the retractable scope 82 to interrupt the feed of solar energy into the chamber such that the amount of heat fed and/or absorbed by the heat absorbing member 20, 120 within the chamber 12 is maintained at a temperature which is below the melting point of the material forming the heat absorbing member 20, 120. The retractable scope 82 is configured to retract or remove the deflecting mirror 40 from the focal point or sub-focal point. This movement can be achieved manually or electronically in response to the heat sensors 80. The scope 82 can return the deflecting mirror 40 to its proper position once the chamber 12 has cooled to a predetermined temperature.

Figure 6A:
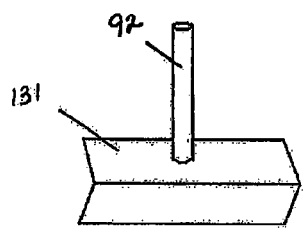
FIGS. 6A and 6B show a top view and a front view of the tracking cones of FIG. 5.
Figure 6B:
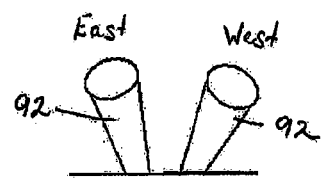

Reference is now made to FIGS. 6A-6B which show a daily east-to-west tracking system that can be used to control the rotation of the solar collecting panel 19. The daily tracking system includes at least two cones 92 mounted on a flat surface of the solar collecting system 46. The cones 92 are positioned at slight diverging angles with respect to each other such that the collective panel axis of rotation at a perpendicular line in relation to the east-west axis at all times as the collecting panel 19 rotates. The purpose of the tracking system is to track the sun during the sunny hours as the sun cruises from east to west and maintain the sun rays perpendicular on the collective panel at all times. Seasonal manual adjustment of the collector panel (the whole system) for seasonal inclination along the north-south axis can be provided to further adjust the system due to seasonal inclination of the sun. Each of the cones includes a photocell located at the bottom of the cone. The cones 92 can be placed, for example, on the upper surface of the arm 131 of the solar collecting system extending in an east-west direction with respect to each other. The cones 92 are placed in an upright position at a slightly tilted angle extending away from each other to ensure that none of the rays of the sun enter the cones at the same time. The east cone can be wired to an electric circuit such that it would be interrupted once the sunlight hits the photocell at the bottom of the east cone. The collecting panel 19 will then stop rotation and then resume rotating once the sunlight is no longer shining into the cones 92 as the sun moves to the west. The west cone can be wired to an electric circuit that would accelerate rotation of the collecting panel 19 once the sunlight hits the photocell in the bottom of the cone. The cones are placed in an upright position such that no shadow appears in the north or south at the cone base. Any shadow to the south of the cone base would indicate an inclination to the north and vice versa, and thus adjustment would be necessary. During the daily east-west tracking, the cones 92 are placed on the arm 131 of the solar collecting system 46 along the east-west axis. These cones 92 are diverted from each other at a narrow angle. The collector panel includes a gear system that is set to rotate at a predetermined speed to approximately follow the speed of the sun as it cruises from east to west. The cones 92 act as a control system to maintain the sunlight perpendicular on the collector panel 19. Once the sun shines inside the east cone, such indicates that the collector panel 19 is rotating too fast and the electric circuit is cut off to briefly stop the rotation of the collector panel until the rays no longer shine inside the cone. The collector panel 19 then resumes rotation at the predetermined speed. Once the sun shines inside the west cone, indicating that the collector panel is rotating slower than it should be, and thus, the speed of the collector panel is accelerated to make up this lag. When the sunlight is no longer shining inside the west cone, the predetermined speed of rotation is resumed. Since the sun tracking is set to work automatically and self-adjusts, any cloud interruption will not stop the collector panel rotation and once the clouds clear, readjustment is carried out automatically using the same principals set forth above. The seasonal tracking system includes providing a plurality of adjustable mounting legs 96, i.e., five legs, for supporting the solar collecting system 46. These legs are equipped with screws that can be manually twisted up and down on the north-south axis, i.e., lowering or elevating the entire system until the north or south shadow relative to the cones disappears, indicating no more inclination. Seasonal inclination is very slow and readjustment should take place every few weeks.

Accordingly, the present invention is a clean energy, economically feasible, system that is simple in design and operation, is self-sustainable, and features a central mechanism that is capable of a steadily high percentage of collection of available solar energy. Furthermore, the present invention exploits the broad spectrum of the harnessed solar energy and uses it in a creative way to include energy storage and the use of a thermal emitter to obtain the most powerful and cheapest electricity possible by diversifying the electricity energy mix, i.e., both AC and DC electricity on a sustainable basis, using the power of simplicity and by applying a new twist in solar physics. One such creative way is a system that includes both photovoltaic and thermophotovoltaic cell technology which generates electricity from waste heat, as well as from direct condensed solar beams at zero carbon emissions, which is capable of storing thermal energy and being continuously recharged for several weeks, all in a single system. Additionally, the invention is easy to maintain, capable of condensing solar energy onto a focal point that is continuously fixed as a stationary location, i.e., perfect focal point, which can be deflected to a receiver that can convert thermal energy to provide energy for numerous applications. Further still, the invention provides a sun-tracking system that maintains the sun's rays perpendicular on the collecting surface throughout the sunny hours; provides an efficient and effective thermal energy storage system that is capable of providing a steady energy source to meet basic energy demand during the sunless hours for many days; has the capability to integrate and co-generate with other sources of green energy in multi-hybrid arrangements having expandable features; and has a desirable level of efficiency which is obtainable through the used smaller space requirements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the invention. For example, it is to be understood that the present invention contemplates that, to the extent possible, one or more features of any embodiment can be combined with one or more features of any other embodiment.

The invention claimed is:

1. An apparatus for storing and/or converting solar energy into a mechanical and/or electrical energy product, said apparatus comprising:
  an enclosed volume chamber having a wall defining an interior of the chamber, said wall having an inner surface including a plurality of thermophotovoltaic cells located directly thereon wherein the thermophotovoltaic cells line the entire inner surface of the wall, or a wall defining an interior chamber said wall being formed by the thermophotovoltaic cells facing the interior of the chamber;
  at least one first opening extending through the wall of the chamber for admitting a condensed high-temperature solar energy beam into the chamber;
  a heat absorbing member located within said chamber for receiving at least a portion of the solar energy beams;
  at least one inlet extending through the wall of the chamber for feeding air into said chamber wherein the air becomes heated;

an open space containing air located between the inner surface of the chamber and the heat absorbing member, wherein a portion of the condensed high energy solar beam heats the air contained within the open space;
a first conversion device associated with the thermophotovoltaic cells for converting the heat energy into electrical energy;
at least one outlet for allowing said heated air to exit said chamber; and
a second conversion device configured for cooperating with the outlet for receiving the heated air and for converting the heated air to mechanical and/or electrical energy,
wherein the solar energy beams, the heat absorbing member, and the heated air within the chamber emit heat energy to the thermophotovoltaic cells.

2. The apparatus of claim 1, wherein the heat energy applied to the thermophotovoltaic cells causes the cells to become excited into DC electricity and the first conversion device comprises a wiring system associated with the thermophotovoltaic cells for carrying the DC electricity to a target location for use.

3. The apparatus of claim 1, wherein the second conversion device is a turbine connected to a generator for converting the heated air into AC electricity.

4. The apparatus of claim 1, wherein the heat absorbing member is capable of continuously storing at least a portion of the heat energy for heating the air fed into the chamber.

5. The apparatus of claim 1, including a single continuous cooling tunnel extending about an outer surface of the inner wall of the chamber for cooling the thermophotovoltaic cells.

6. The apparatus of claim 5, wherein the cooling tunnel includes at least one inlet and one outlet opening for cycling cooling material through the cooling tunnel.

7. The apparatus of claim 1, wherein the thermophotovoltaic cells are formed from gallium antimonide, germanium, or one or more material of similar frequency as gallium antimonide or germanium.

8. The apparatus of claim 1, wherein the plurality of thermophotovoltaic cells comprises an array formed from multiple frequency cells.

9. The apparatus of claim 3, wherein the air fed into the chamber is fed at ambient temperature having sufficient expansion force to drive the thermal energy out of the chamber to the turbine.

10. The apparatus of claim 1, wherein the wall of the chamber is formed from a net formed from the plurality of thermophotovoltaic cells held in an interlocking arrangement within a plurality of frames.

11. The apparatus of claim 1, wherein the heat absorbing member is formed from a combination of heat absorbing materials having differing heat capacity levels and the chamber is capable of storing heat energy for up to several weeks, depending upon the rate of depletion and/or the amount of usage of the heat energy.

12. The apparatus of claim 1, wherein the condensed solar energy beam is supplied from a solar collecting system comprising a parabolic solar collector panel configured for reflecting solar rays to one of a focal point and a sub-focal point to at least partially condense said rays and at least one deflecting mirror mounted at one of said focal point and sub-focal point for receiving said condensed rays and redirecting said rays as the condensed solar energy beam to said enclosed chamber.

13. The apparatus of claim 12, including a heat sensor for monitoring the temperature level of the enclosed volume chamber, said heat sensor being in communication with a power source for moving the at least one deflecting mirror from the focal point to interrupt the feed of the solar energy beam into the chamber at a given time and to control the amount of heat absorbed by the chamber and/or for increasing the airflow entering into the chamber.

14. The apparatus of claim 13, wherein the amount of heat fed into the chamber for recharging is depleted as needed such that the amount of heat contained within the chamber is maintained at a temperature that is below the melting point of the material forming the heat absorbing member.

15. The apparatus of claim 1, wherein the enclosed chamber includes at least a second opening for receiving a solar energy beam into the chamber and wherein at least the first opening and the second opening includes a one-way mirror.

16. The apparatus of claim 1, wherein the stored thermal energy is capable of being fed to a second enclosed volume chamber to enable the second enclosed volume chamber to increase and/or maintain a predetermined level of heat energy in the second chamber.

17. The apparatus of claim 1, including a daily tracking system comprising at least two cones mounted on the solar collecting system, each of said cones including a photocell at a bottom portion thereof, said photocells including a signaling member associated with a motor for rotating the solar collection system at a predetermined speed wherein the speed of rotation is adjusted based upon the sun's contact with the photocells to ensure perpendicular positioning of the sun with respect to the collecting panel.

18. An apparatus for converting solar energy simultaneously into AC and DC electricity, said apparatus comprising:
a chamber having a wall defining an interior of the chamber, said wall having an inner surface including a plurality of thermophotovoltaic cells located directly thereon wherein the thermophotovoltaic cells line the entire inner surface of the wall, or a wall defining an interior chamber, said wall being formed by the thermophotovoltaic cells facing the interior of the chamber;
at least one opening extending through the wall of the chamber for admitting a condensed high-temperature solar energy beam into the chamber;
a heat absorbing member located within the chamber for absorbing at least a portion of the solar energy beam and emitting heat to the thermophotovoltaic cells;
a first conversion device for converting energy from the thermophotovoltaic cells into DC electricity; and
a second conversion device for converting the heat absorbed by the heat absorbing member into AC electricity,
wherein the chamber includes air located therein and wherein the air is heated by the heat absorbing member and at least a portion of the solar energy beams.

19. The apparatus of claim 18, wherein heat is emitted to the thermophotovoltaic cells by a combination of heat energy emitted by the heat absorbing member, the heated air, and directly by the condensed high temperature solar energy beams.

20. The apparatus of claim 6, wherein the cooling tunnel includes a single inlet and a single outlet and wherein the inlet and outlet are positioned adjacent one another such that the cooling material enters into the inlet, flows along the continuous cooling tunnel about the outer surface of the inner wall of the chamber, and then exits through the outlet.

* * * * *